United States Patent
Snider

(10) Patent No.: US 8,320,872 B2
(45) Date of Patent: Nov. 27, 2012

(54) APPARATUS AND METHOD FOR BROADCASTING THE DETECTION OF RF JAMMER PRESENCE

(75) Inventor: James Snider, Kildeer, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 431 days.

(21) Appl. No.: 12/643,825

(22) Filed: Dec. 21, 2009

(65) Prior Publication Data

US 2011/0151827 A1 Jun. 23, 2011

(51) Int. Cl.
*H04M 11/04* (2006.01)
*H04W 72/00* (2009.01)

(52) U.S. Cl. ..................... 455/404.1; 455/450

(58) Field of Classification Search ............... 455/404.1, 455/404.2, 410, 414.1, 418–420, 450, 448, 455/451, 452.1
See application file for complete search history.

(56) References Cited

U.S. PATENT DOCUMENTS

| | | | |
|---|---|---|---|
| 5,895,436 A | 4/1999 | Savoie et al. | |
| 6,803,861 B2 | 10/2004 | Flick | |
| 7,091,835 B2 * | 8/2006 | Boulay et al. | 340/426.19 |
| 8,059,619 B2 * | 11/2011 | Jakobsen et al. | 370/337 |
| 2002/0014978 A1 | 2/2002 | Flick | |
| 2002/0163906 A1 | 11/2002 | Diachina et al. | |
| 2003/0222813 A1 | 12/2003 | Boulay et al. | |
| 2004/0005858 A1 | 1/2004 | Cervinka et al. | |
| 2004/0075539 A1 | 4/2004 | Savoie et al. | |
| 2005/0088318 A1 | 4/2005 | Liu et al. | |
| 2005/0090952 A1 | 4/2005 | Boulay et al. | |
| 2006/0007039 A1 | 1/2006 | Duvall | |
| 2006/0267744 A1 | 11/2006 | Baumgartner et al. | |
| 2007/0049323 A1 | 3/2007 | Wang et al. | |
| 2007/0079376 A1 | 4/2007 | Robert et al. | |
| 2007/0200688 A1 | 8/2007 | Tang et al. | |
| 2008/0186932 A1 | 8/2008 | Do et al. | |
| 2009/0042518 A1 * | 2/2009 | Ido et al. | 455/90.2 |

FOREIGN PATENT DOCUMENTS

| | | |
|---|---|---|
| DE | 10009488 A1 | 11/2000 |
| DE | 102004048668 A1 | 4/2006 |
| EP | 0167442 A2 | 1/1986 |
| EP | 1362753 A1 | 11/2003 |
| EP | 1514444 A1 | 3/2005 |
| EP | 1593564 A1 | 11/2005 |
| EP | 1809057 A1 | 7/2007 |
| EP | 2003818 A1 | 12/2008 |
| EP | 2124428 A1 | 11/2009 |

(Continued)

OTHER PUBLICATIONS

International Search Report dated Jun. 17, 2011, from corresponding International Patent Application No. PCT/US2010/060787.

(Continued)

*Primary Examiner* — Brandon Miller

(57) ABSTRACT

The jamming of a radio frequency (RF) transmission after the vehicle is parked is detected. When the jamming is detected, an emergency message is broadcast on a first random access channel (RACH) associated with the vehicle according to a last known broadcast channel (BCH). When the jamming is detected, at least one last known neighbor serving cell from a stored data structure is determined, and the emergency message is broadcast on one or more second RACHs associated with each of the at least one last known neighbor serving cells.

20 Claims, 3 Drawing Sheets

FOREIGN PATENT DOCUMENTS

| | | | |
|---|---|---|---|
| GB | 2296843 A | | 7/1996 |
| GB | 2317418 A | | 3/1998 |
| GB | 2407455 A | * | 4/2005 |
| GB | 2435987 A | | 9/2007 |
| GB | 2445046 A | | 6/2008 |
| GB | 2457102 A | | 8/2009 |
| WO | 95/33214 A1 | | 12/1995 |
| WO | 96/04155 A1 | | 2/1996 |
| WO | 00/21053 A1 | | 4/2000 |
| WO | 01/32481 A1 | | 5/2001 |
| WO | WO01/31797 A1 | | 5/2001 |
| WO | 03/103322 A1 | | 12/2003 |
| WO | 2005/112321 A1 | | 11/2005 |
| WO | 2006/092737 A2 | | 9/2006 |
| WO | 2007/019814 A1 | | 2/2007 |
| WO | 2008/111001 A2 | | 9/2008 |

OTHER PUBLICATIONS

International Search Report dated Jun. 1, 2011, from corresponding International Patent Application No. PCT/US2010/060723.
International Search Report dated Mar. 28, 2011, from corresponding International Patent Application No. PCT/US2010/060803.
International Search Report dated Apr. 15, 2011, from corresponding International Patent Application No. PCT/US2010/060773.
M. Molly; M-B Pautet, "Mobility and Security Management" GSM System for Mobile Communications, Jan. 1, 1993, pp. 432-498, Europe Media, Lassay-Les-Chateaux, France.
International Search Report dated Apr. 12, 2011, from corresponding International Patent Application No. PCT/US2010/060760.
International Search Report dated Mar. 10, 2011, from corresponding International Patent Application No. PCT/US2010/060811.
International Search Report dated Mar. 1, 2011, from corresponding International Patent Application No. PCT/US2010/060750.
International Search Report dated Feb. 28, 2011, from corresponding International Patent Application No. PCT/US2010/060532.
International Search Report dated Mar. 1, 2011, from corresponding International Patent Application No. PCT/US2010/060527.
International Search Report dated May 13, 2011, from corresponding International Patent Application No. PCT/US2010/060675.
International Search Report dated Jun. 28, 2011, from corresponding International Patent Application No. PCT/US2010/060795.
International Search Report dated May 24, 2011, from corresponding International Patent Application No. PCT/US2010/060518.

* cited by examiner

APPARATUS AND METHOD FOR BROADCASTING THE DETECTION OF RF JAMMER PRESENCE

CROSS REFERENCES TO RELATED APPLICATIONS

"Apparatus and Method for Detecting Jamming of Communications" having U.S. patent application Ser. No. 12/643,049

"Apparatus and Method for Compromised Vehicle Tracking" having U.S. patent application Ser. No. 12/643,498

"Apparatus and Method for Detecting a Cloned Base Station" having U.S. patent application Ser. No. 12/643,081

"Apparatus and Method for detecting Communication Interference" having U.S. patent application Ser. No. 12/643,068

"Apparatus and Method for Detecting a Cloned Base Station" having U.S. patent application Ser. No. 12/643,353

"Apparatus and Method for Determining an Invalid Base Station" having U.S. patent application Ser. No. 12/643,463

"Apparatus and Method for Determining Vehicle Location" having U.S. patent application Ser. No. 12/643,412

"Apparatus and Method for Maintaining Communication with a Stolen Vehicle Tracking Device" having U.S. patent application Ser. No. 12/643,336

"Apparatus and Method for Reducing False Alarms in Stolen Vehicle Tracking" having U.S. patent application Ser. No. 12/643,889

"Apparatus and Method for Tracking Stolen Vehicles" having U.S. patent application Ser. No. 12/643,862

"Apparatus and Method for Maintaining Communications with a Vehicle in the Presence of Jamming" having U.S. Pat. No. 8,175,573 all of which being filed on the same date as the present application and both of which having their contents incorporated herein by reference in their entireties.

FIELD OF THE INVENTION

The field of the invention relates to communications between various entities and, more specifically to the detection of jamming or attempted jamming of these communications.

BACKGROUND

Vehicles are equipped with various types of communication systems that provide or facilitate various types of functions. For instance, a vehicle may be equipped with a global positioning satellite (GPS) system that provides for locating the vehicle and providing information concerning the location of the vehicle to a user. Vehicle security systems are also employed in many vehicles to protect the vehicle and its contents from theft or other criminal activity. For example, a vehicular security system may be configured to communicate with some outside entity (e.g., a police or security center) and when an attempt is made to break into a vehicle, the vehicular security system may transmit messages to the outside entity where appropriate action may be taken to prevent or stop the break in. Some jurisdictions even require the use of security systems in vehicles because of the high number of vehicle break-ins or thefts in these areas.

If a vehicle is stolen, stolen vehicle tracking (SVT) applications attempt to track and sometimes recover the stolen vehicle. To give one example, some SVT applications rely upon a GPS system to pinpoint the location of the vehicle and a Global System for Mobile communications (GSM) cellular network to report the incident to a service provider via Short Message Service (SMS) or General Packet Radio Service (GPRS) data connections.

Potential thieves have sometimes attempted to jam the receiver hardware located at the vehicle by employing devices that create a strong wide-band signal in the receive band and thereby block the GPS satellite from being received at the vehicle and/or to block GSM network signals that are sent from the cellular base station to the vehicle. Previous attempts at detecting such jamming and/or attempted jamming and reporting these actions to a security center have generally been unsuccessful and/or expensive to accomplish.

Figure 1:
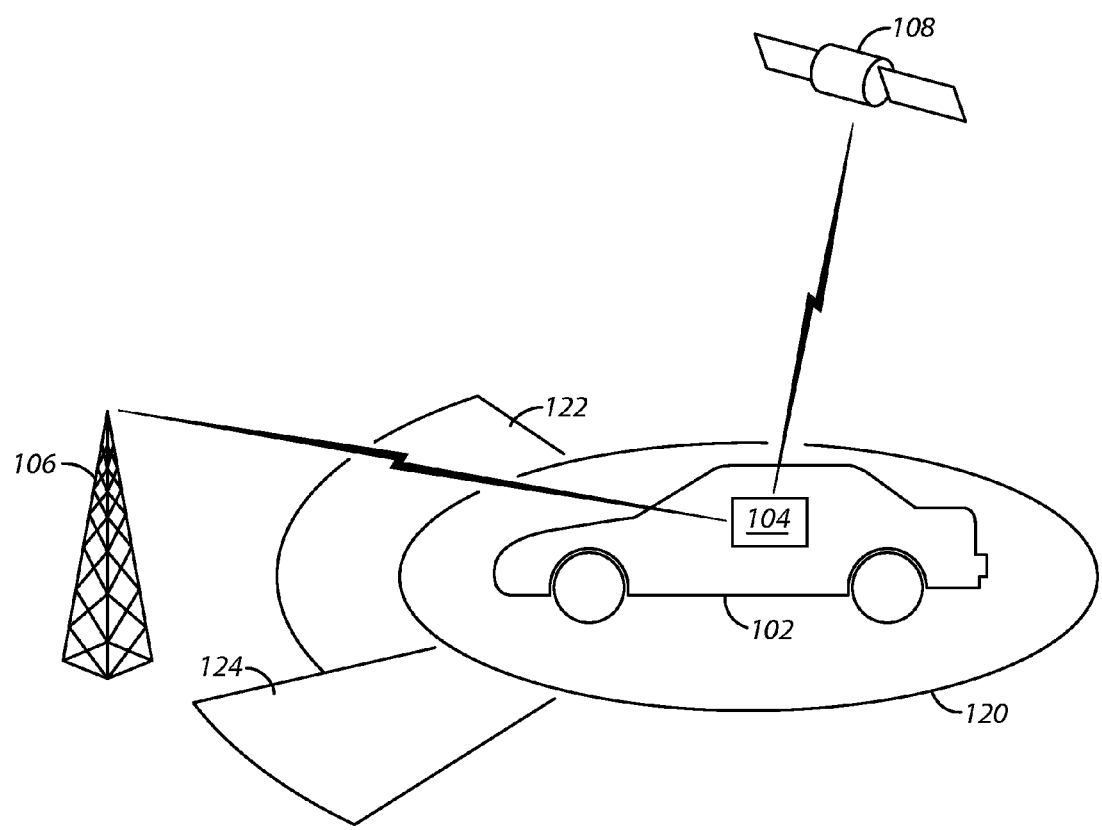
FIG. 1 comprises a block diagram of a system and apparatus for detecting jamming and sending a warning message according to various embodiments of the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Approaches are provided where jamming is detected and once jamming of communications is detected a warning message is broadcast to alert the user or other appropriate authorities that a vehicle is being stolen or a theft from the vehicle is being attempted. The approaches described herein are easy to use, easy to retrofit into existing systems, and are accurate in indicating the theft or attempted theft of the vehicle.

In many of these embodiments, the jamming of a radio frequency (RF) transmission is detected (e.g., after the vehicle is parked). When the jamming is detected, an emergency message is broadcast on a first random access channel (RACH) associated with the vehicle that was identified according to or received over the last known broadcast channel (BCH). When the jamming is detected, at least one last known neighbor serving cell is determined from a stored data structure (in one example, the Base Allocation (BA) table), and the emergency message may also be broadcast on one or more second RACHs associated with each of the at least one last known neighbor serving cells. In some examples, broadcasting is halted on the first RACH upon the occurrence of a predetermined event. Base stations typically only listen for the RACH. The RACH occurs on the same physical channel as the BCH so if a mobile has service (or no service) the base station is only listening for the mobile's RACH burst. The base station needs to see the mobile's RACH first before it can assign another channel type such as a Traffic Channel or a Packet Data Traffic Channel.

As used herein, "RACH" refers to an uplink communication channel used by a mobile wireless unit to establish communications with an outside entity such as a base station. The communication channel may be configured to be a GSM channel. In addition, Code Division Multiple Access (CDMA) channels can be used. In this case Access Probe Bursts can be used to establish communications. As used herein, the term "BCH" refers to a downlink channel that communicates information from a base station (or other external system or network) to a mobile wireless device. In some examples, the BCH channel provides signaling information to the mobile device, so that the mobile device can locate, synchronize, and access the network. Three types of BCH are typically used in GSM networks: Broadcast Control Channel (BCCH), Synchronization Channel (SCH), and Frequency Correction Channel (FCCH). Other types of BCH channels are possible.

The stored data structure can assume a variety of forms in the examples described herein. In one example, the stored data structure comprises a base allocation table. In another example, a linked list may be used. Other examples of data structures are possible.

The predetermined event that triggers the halting of the broadcasting on the first RACH may be a variety of different types of events. For example, the predetermined event may include the receipt of an indication that the emergency message has been received by an outside entity. In another example, the predetermined event includes the expiration of a timer. Other examples are possible.

In some of these embodiments, broadcasting is also halted on the one or more second RACHs associated with each of the last known neighbor serving cells upon an occurrence of a predetermined event. In some examples, the predetermined event includes a receipt of an indication that the emergency message has been received from the outside entity. In another example, the predetermined event comprises an expiration of a timer. Other examples of predetermined events are possible.

In others of these embodiments, an apparatus for broadcasting an emergency message regarding a theft or an attempted theft of a vehicle includes an antenna, an interface, a memory, and a controller. The antenna is configured to receive a radio frequency (RF) transmission. The memory is configured to store a data structure and the data structure indicates at least one last know neighbor serving cell.

The controller is coupled to the antenna, the interface, and the memory. The controller is configured to detect the jamming of the RF transmissions received at the antenna (and/or made from the antenna) after the vehicle is parked (or upon the occurrence of some other event), and to, when the jamming is detected, broadcast an emergency message on a first random access channel (RACH) at the antenna according to a last known broadcast channel (BCH). The controller is further configured to, when the jamming is detected, determine at least one last known neighbor serving cell from the stored data structure in the memory, and to broadcast at the output of the interface the emergency message on one or more second RACHs associated with each of the at least one last known neighbor serving cells.

Referring now to FIG. 1, one example of a system for detecting the jamming of vehicular communications and issuing a warning message is described. A vehicle 102 includes a communication and jamming detection device 104. The communication and jamming detection device 104 is disposed anywhere in or at the vehicle and communicates with a base station 106 and an external navigation system 108.

The communication and jamming detection device 104 may be, in one example, a programmed electronic device that determines the location of the vehicle 102 from signals received from the navigation system 108 and determines if jamming and/or attempted jamming is occurring as to signals being received and/or being transmitted. Alternatively, another separate device may be used to determine the location of the vehicle and this separate device may communicate with the communication and jamming detection device 104. The external navigation system 108 may be a GPS satellite or satellite system, in one example.

Many of the approaches described herein are described as being executed by devices that are at least partially disposed at or within a vehicle. However, it will be appreciated that the approaches described herein are not limited to devices that can be disposed at or within vehicles, but can be used with devices that are disposed at any location such as within homes, businesses, or even with individuals that are not within or associated with a vehicle.

The vehicle 102 may be any type of vehicle such as a car, truck, bus, airplane, ship, to name a few examples. The communication and jamming detection device 104 is any type of communication device that communicates with entities outside the vehicle 102 using any type of communication technology or protocol. For example, the communication and jamming detection device 104 may be or may incorporate a cellular phone, transponder, radio, or some combination of these or other devices.

In one example of the operation of the system of FIG. 1, the jamming of a radio frequency (RF) transmission after the vehicle is parked is detected by the communication and jamming detection device 104. The jamming may be detected by a variety of different ways. For example, as described in co-pending application entitled "Apparatus and Method of Detecting Jamming of Communications" having U.S. patent application Ser. No. 12/643,049 and filed on the same date as the present application, a first rate of rise of a signal strength indicator associated with a first communication channel is monitored and a second rate of rise of a signal quality indicator associated with a first communication channel is also monitored. When at least one of the first rate rises at a rate greater than a first predetermined threshold rate or the second rate rises at a rate that is greater than a second predetermined threshold rate, jamming is determined to be occurring.

In another example of jamming detection and as described in co-pending application entitled "Apparatus and Method for detecting Communication Interference" having U.S. patent application Ser. No. 12/643,068 and filed on the same date as the present application, location determination signals are received and a location of interest is determined from the location determination signals. Communication service is established and synchronized with a known, valid base station via a first communication channel. The value of a signal strength indicator associated with the first communication channel is monitored. When the value of the signal strength indicator falls below a threshold level, a warning message is transmitted to the known, valid base station before synchronization of the communication service is lost with the known, valid base station.

When the jamming is detected by the communication and jamming detection device 104, an emergency message is broadcast on a first random access channel (RACH) associated with the vehicle 102 as indicated by information received over the last known broadcast channel (BCH). The last known BCH is the last BCH that was known to be a valid BCH. For example, a data structure associated with the device 104 may indicate that RACH channel 23 is the RACH channel identified over the last known and valid BCH.

The warning or emergency message may take a wide variety of forms and may include a wide variety of information. For example, the warning message may indicate the nature of the emergency (e.g., attempted theft of the vehicle, unauthorized entry into the vehicle) or the current location of the vehicle, to name two examples.

Each serving cell may have one or more RACHs that are different from the other serving cells. As the vehicle 102 moves between cells or within cells, the RACH may change. For example, if the vehicle is at a periphery of a cell and moves around this periphery, the neighboring cells (and the RACHs) may change.

Consequently, in some of these approaches, when jamming is detected, the identity of one or more known neighbor serving cell are determined from a stored data structure. In the present example, the table may indicate that serving cells 122 and 124 are near the present serving cell 120. The determination may be made using a look-up table, in one example. After the serving cells are determined, one (or more) RACHs associated with each of these serving cells are determined. In this example, cells 122 and 124 may have associated RACHs 26 and 28. Subsequently, the emergency message is broadcast on the determined RACHs (e.g., RACHs 26 and 28) that are associated with the neighbor serving cells 122 and 124.

In some examples, broadcasting is halted on the first RACH upon the occurrence of a predetermined event. The predetermined event may be a variety of different types of events. For example, the predetermined event may include the receipt of an indication that the emergency message has been received by an outside entity (e.g., a base station or emergency reporting center). In another example, the predetermined event includes the expiration of a timer. Other examples of predetermined events are possible.

In some others of these embodiments, broadcasting is halted on the one or more second RACHs associated with each of the last known neighbor serving cells upon an occurrence of a predetermined event. In some examples, the predetermined event includes a receipt of an indication that the emergency message has been received from the outside entity. In another example, the predetermined event comprises an expiration of a timer. Other examples of predetermined events are possible.

The data structure can assume a variety of forms. In one example, the stored data structure comprises a base allocation table. In another example, the data structure is a linked list. Other examples of data structures are possible.

Various other actions can be taken once jamming is detected. As mentioned, a warning or emergency message can be transmitted via one or more RACHs. In other examples, other frequencies and/or other types of networks in addition to or instead of the RACHs can be used to transmit the warning message (and/or transmit or receive other communications). For example, warning messages may be transmitted at FM Radio Data System (RDS) frequencies, over Wireless Local Area Networks such as WiFi networks, over infrared (IR) networks, Bluetooth (BT) networks, to "amber alert" stations (e.g., using the Emergency Alert System (EAS) or Emergency Broadcast System (EBS)), over Worldwide Interoperability for Microwave Access (WiMAX) networks, over Code Division Multiple Access/Integrated Digital Enhanced Network (CDMA/iDEN) systems, and/or over Advanced Mobile Phone System (AMPS) networks. In addition, Morse code (or some other coding approach) may be transmitted using the horn and/or headlights of the vehicle 102 (or some other device in the vehicle). In still other examples, a short messaging service (SMS) cell broadcast is made once jamming is detected. Other examples are possible.

Broadcast FM RDS uses a sub-carrier to communicate digital information to the user's radio and to the user. The information for the user is text, such as the station call sign, and is usually presented to the user on the display of the car radio. In the present approaches, RDS may be used to carry a warning message would be to have the SVT unit transmit an RDS message on one or more broadcast FM channels with a text message such as "Help! Stolen Car: silver Chevy license 997 KLM". This message would be received in the vicinity of the stolen vehicle and could be seen by drivers whose cars are in the vicinity of the stolen vehicle. Even though nearby drivers are listening to a standard broadcasting station on the same frequency, the signal from the SVT unit would be received due to its higher signal strength at the receiver due to the small separation distance. One of these drivers could then make a call to the police or some other authority. Due to the short range nature of the communications, the stolen vehicle would be in the vicinity of this person's car.

A security beacon can be deployed in the vehicle 102 and can be activated once jamming is detected. For example, a security beacon such as those manufactured by the LoJack Corporation can be used. The security beacon transmits signals that can be detected and used to locate the vehicle 102. The security beacon can be used in addition to or in place of the communications (e.g., warning messages) that are transmitted, for example, over GSM systems.

In another example, the communication device 104 can transmit a periodic (or non-periodic) "pinging" signal to a server (e.g., a stolen vehicle tracking (SVT) server). If the server detects no pinging signal, it may assume that the vehicle is stolen. The server, in this example, is external to the vehicle 102.

Any number of antennas may be used by the communication device 104. In one example two antennas are used and one antenna is used to transmit signals and the other is used to receive signals. In other examples, multiple TX and RX antennas can be used with some of the antennas being used as backup antennas. If the path loss abruptly changes, then the device can switch antennas. In one aspect, when jamming is occurring (or detected to be occurring) then the device can switch antennas and attempt to communicate on the backup antenna or backup antennas. In still other examples, a single antenna is used.

In another aspect, once jamming is detected various actions can be taken that affect the operation of the vehicle and/or a driver's ability to successfully drive the vehicle 102. In these examples, it is assumed that the detection of jamming denotes an attempt to steal by a criminal to steal the vehicle 102 and/or its contents. Consequently, these approaches attempt to stop the theft of the vehicle 102 and/or its contents by adversely affecting the operation of the vehicle so that the criminal has a difficult or impossible time operating the vehicle 102. For example, the radio operation can be changed (e.g., by setting its sound level to a deafening level), the operation of the lights of the vehicle can be adjusted (e.g., by deactivating the lights at night), the operation of the horn can be altered (e.g., by activating the horn), the operation of the stability control system can be altered (e.g., to cause unstable operation), the seat location can be adjusted (e.g., by moving the seat to an uncomfortable position), the operation of heat controlled seats can be changed (e.g., by setting a temperature that is uncomfortable or scalding to a driver), the steering wheel operation can be altered (e.g., by locking the steering wheel), the temperature of the vehicle interior can be changed (e.g., by setting the temperature to an uncomfortable hot or cold setting), and/or the tone of an audible device can be altered (e.g., to produce a deafening tone) based upon the detection of jamming to thereby make theft of the vehicle and/or its contents difficult or impossible for the thief to achieve.

In some other examples of jamming detection, areas of known good signal strength are located by the communication device 104 and/or some external device or system. If the signal from the device stops without the vehicle moving, jamming is determined to be occurring. In other aspects, areas of known good signal strength are determined (e.g., a known good signal strength for a particular area, time, or other parameter), and if the signal transmitted from the device varies significantly (e.g., beyond a threshold amount) from expected levels jamming is determined to be occurring. The threshold can be based upon map data provided by a system or device that is disposed external to the communication device 104 and/or developed by the device 104 from previous readings (e.g., previous drives) to name two approaches.

In other aspects, the location of the vehicle 102 can be tracked even as jamming is occurring. For instance, Rx Level and/or Rx Qual readings (e.g., reported by one or more communication devices to an external service center) may be used to identify and/or confirm jammer presence and pinpoint location of the vehicle 102, for example, using triangulation approaches.

In some aspects, the communication device may authenticate the base station 106. For example, various hand-shaking approaches may be used by the communication device to authenticate the base station 106.

Figure 2:
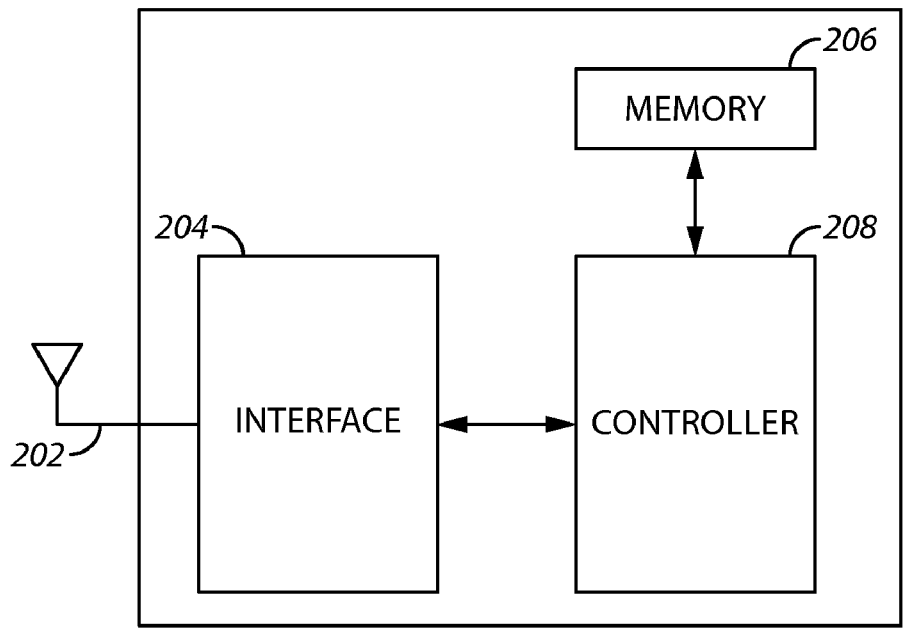
FIG. 2 comprises a block diagram of an apparatus for detecting jamming and sending a warning message according to various embodiments of the present invention.

Referring now to FIG. 2, an apparatus 200 for broadcasting an emergency message regarding a theft or an attempted theft of a vehicle includes an antenna 202, an interface 204, a memory 206, and a controller 208. The antenna 202 is configured to receive a radio frequency (RF) transmissions. As described herein a single or multiple antennas can be used. For example, one antenna 202 may be used to transmit messages while another antenna can be used to receive messages. Other examples are possible. The memory 206 may include computer instructions that implement any of the approaches described herein.

The interface 204 is coupled to the antenna 202 and may be any combination of hardware and/or programmed software that receives signals from the antenna 202 and presents the signal to the controller 208 in a form usable by the controller 208. Conversely, the interface 204 also receives information from the controller 208 that is to be transmitted via the antenna 202. In this respect, the interface formats and/or processes the signals in an appropriate format and having appropriate electrical characteristics for transmission from the antenna 202.

The memory 206 is configured to store a data structure and the data structure indicates at least one last known neighbor serving cell. The memory 206 can be any type of memory storage device such as a random access memory (RAM), read only memory (ROM) to name two examples. Other examples of memories are possible.

The controller 208 is coupled to the interface 204 and the memory 206. The controller 208 is configured to detect the jamming of the RF transmissions received at (and/or transmitted by) the antenna 202 after the vehicle is parked, and to, when the jamming is detected, broadcast an emergency message on a first random access channel (RACH) the antenna 202 according to a last known broadcast channel (BCH). For example, the controller 208 may consult a data structure for the first RACH and then broadcast over the first RACH.

Determination as to whether the vehicle is parked may be made by an accelerometer or a message from the vehicle via a vehicle communication bus such as CAN, J1850, MOST, an ignition key off indication, and so forth In some examples, the controller 208 is further configured to, when the jamming is detected, determine the at least one last known neighbor serving cell from the stored data structure in the memory 206, and to broadcast at the output of the interface 204 (i.e., at the antenna 202) the emergency message on one or more second RACHs associated with each of the at least one last known neighbor serving cells. For example, the controller 208 may consult the data structure, determine the identity of the neighboring cells, and once the identity is determined, determine the RACHs associated with these cells. The information is stored in the mobile's BA table (in the memory 206) and, in some examples, is a look-up table that states what other channels are in the immediate area. The BA table is downloaded from the base station for which the apparatus 200 has established service and is operating.

Figure 3:
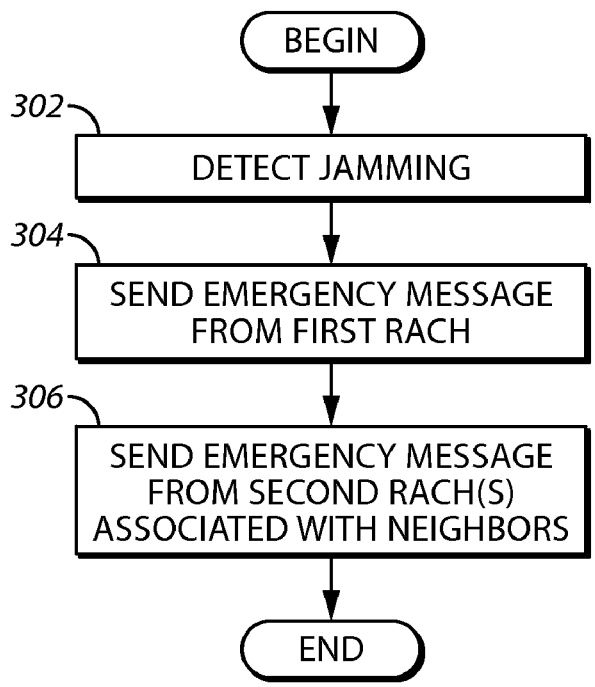
FIG. 3 comprises a flowchart of one example of an approach for detecting jamming and sending a warning message according to various embodiments of the present invention.

Referring now to FIG. 3, an approach for issuing a warning message to a user or other appropriate authority is described. The approaches described may be implemented from a communication and jamming detection device that is positioned within a vehicle such as the device 104 of FIG. 1 or the device 200 described with respect to FIG. 2.

At step 302, the jamming of a radio frequency (RF) transmission after the vehicle is parked is detected. As mentioned, the jamming can be detected by various approaches such as monitoring received signal strength levels.

At step 304, when the jamming is detected, an emergency message is broadcast on a first random access channel (RACH) associated with the vehicle according to a last known broadcast channel (BCH). For example, a data structure may store the first RACH (received over the last known and valid BCH) and the emergency message may be sent over this first RACH when jamming is detected.

At step 306, when the jamming is detected, at least one last known neighbor serving cell from a stored data structure is determined, and the emergency message is broadcast on one or more second RACHs associated with each of the at least one last known neighbor serving cells. As with the first RACH, a data structure may store the identities of the second RACHs and the serving cells associated with these second RACHs. Once the neighboring cells are determined, the second RACHs are then determined and the warning message transmitted over the second RACHs. Every base station knows where its neighbors are. When the mobile device (e.g., the device 200 of FIG. 2) acquires service on a base station, the base station sends down the BA table to the mobile unit. In so doing, the mobile unit (e.g., device 200) knows the base station neighbors. In normal operation, it is up to the mobile unit to measure all the powers of the adjacent cells to serving cell so that the serving cell can determine whether the mobile unit should be allowed to do a handover.

Figure 4:
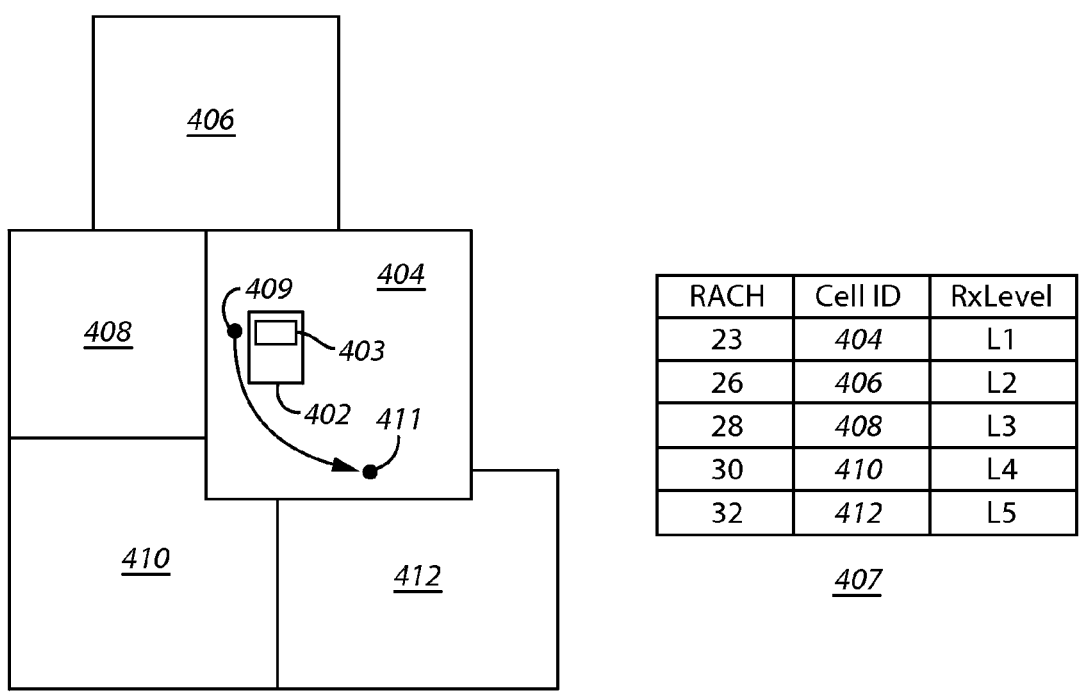
FIG. 4 comprises a block diagram that illustrates the operation of a system that determines the occurrence of jamming and responsively sends an emergency warning message according to various embodiments of the present invention.

Referring to FIG. 4, one example of the operation of a system to detect jamming and transmit emergency warning messages is described. A vehicle 402 moves within cells 404, 406, 408, 410, and 412. An allocation table 407 is constructed and stored within a communication and jamming detection device 403 that is disposed within the vehicle 402.

The allocation table has entries for each of the serving cells 404, 406, 408, 410, and 412. For each of the serving cells indicated, one or more RACH channels are specified. For example, for serving cell 404, RACH 23 is specified; for serving cell 406, RACH 26 is specified; for serving cell 408, RACH 28 is specified; for serving cell 410, RACH 30 is specified; for serving cell 412, RACH 32 is specified. The table 407 is populated from information received on the BCH channel. The device 403 may initially broadcast emergency messages on RACH 23 since RACH 23 is associated with the vehicle according to the last known BCH. An Rx Level is measured by the device 403 and these levels (L1, L2, L3, L4, L5) used to populate the table and corresponding to a particular channel.

In other examples, the device 403 determines the last known neighbor cells. For example, if the vehicle 402 is at point 409, the last known neighbor cells are cells 408 and 410. The last known neighbors may be determined by several approaches such as consulting a downloaded BA table that indicates the neighbors. Hence, the device 403 determines that the neighboring cells are cells 408 and 410, and the will broadcast emergency messages on RACHs 28 and 30. However, when the vehicle moves to position 411, the device 403 determines that the neighboring cell is 412 and the device 403 broadcast emergency messages on channels RACH 32.

Thus, approaches are provided where jamming is detected and once jamming of communications is detected a warning message is broadcast to alert the user or other appropriate authorities that a vehicle is being stolen or a theft from the vehicle is being attempted. The approaches described herein are easy to use, easy to retrofit into existing systems, and are accurate in indicating the theft or attempted theft of the vehicle.

Those skilled in the art will recognize that a wide variety of modifications, alterations, and combinations can be made with respect to the above described embodiments without departing from the spirit and scope of the invention, and that such modifications, alterations, and combinations are to be viewed as being within the scope of the invention.

What is claimed is:

1. A method for broadcasting an emergency message regarding a theft or an attempted theft of a vehicle, the method comprising:
   detecting a jamming of a radio frequency (RF) transmission;
   when the jamming is detected, broadcasting an emergency message on a first random access channel (RACH) associated with the vehicle according to a last known broadcast channel (BCH);
   when the jamming is detected, determining at least one last known neighbor serving cell from a stored data structure, and broadcasting the emergency message on one or more second RACHs associated with each of the at least one last known neighbor serving cells.

2. The method of claim 1 wherein the stored data structure comprises a base allocation table.

3. The method of claim 1 further comprising halting broadcasting on the first RACH upon the occurrence of a predetermined event.

4. The method of claim 3 wherein the predetermined event comprises a receipt of an indication that the emergency message has been received by an outside entity.

5. The method of claim 3 wherein the predetermined event comprises an expiration of a timer.

6. The method of claim 1 further comprising halting broadcasting on the one or more second RACHs associated with each of the last known neighbor serving cells upon an occurrence of a predetermined event.

7. The method of claim 6 wherein the predetermined event comprises a receipt of an indication that the emergency message has been received from the outside entity.

8. The method of claim 6 wherein the predetermined event comprises an expiration of a timer.

9. An apparatus for broadcasting an emergency message regarding a theft or an attempted theft of a vehicle, the apparatus comprising:
   an antenna configured to receive a radio frequency (RF) transmission;
   an interface coupled to the antenna;
   a memory configured to store a data structure, the data structure indicating at least one last know neighbor serving cell;
   a controller coupled to the interface and the memory, the controller configured to detect a jamming of the RF transmission received at the antenna after the vehicle is parked, the controller being further configured to, when the jamming is detected, broadcast an emergency message on a first random access channel (RACH) at the output of the interface according to a last known broadcast channel (BCH), the controller being further configured to, when the jamming is detected, determine the at least one last known neighbor serving cell from the stored data structure in the memory, and to broadcast at the output of the interface the emergency message on one or more second RACHs associated with each of the at least one last known neighbor serving cells.

10. The apparatus of claim 9 wherein the stored data structure comprises a base allocation table.

11. The apparatus of claim 9 wherein the controller is further configured to halt broadcasting on the first RACH upon the occurrence of a predetermined event.

12. The apparatus of claim 11 wherein the predetermined event comprises a receipt of an indication that the emergency message has been received by an outside entity.

13. The apparatus of claim 11 wherein the predetermined event comprises an expiration of a timer.

14. The apparatus of claim 9 wherein the controller is further configured to halt broadcasting on the one or more second RACHs associated with each of the last known neighbor serving cells upon an occurrence of a predetermined event.

15. The apparatus of claim 14 wherein the predetermined event comprises a receipt of an indication that the emergency message has been received from the outside entity.

16. The apparatus of claim 14 wherein the predetermined event comprises an expiration of a timer.

17. A non-transitory computer usable medium having a computer readable program code embodied therein, said computer readable program code adapted to be executed to implement method for broadcasting an emergency message regarding a theft or an attempted theft of a vehicle, the method comprising:
   detecting a jamming of a radio frequency (RF) transmission;
   when the jamming is detected, broadcasting an emergency message on a first random access channel (RACH) associated with the vehicle according to a last known broadcast channel (BCH);
   when the jamming is detected, determining at least one last known neighbor serving cell from a stored data structure, and broadcasting the emergency message on one or more second RACHs associated with each of the at least one last known neighbor serving cells.

18. The non-transitory computer usable medium of claim 17 wherein the stored data structure comprises a base allocation table.

19. The non-transitory computer usable medium of claim 17 further comprising halting broadcasting on the first RACH upon the occurrence of a predetermined event.

20. The non-transitory computer usable medium of claim 19 wherein the predetermined event comprises a receipt of an indication that the emergency message has been received by an outside entity.

* * * * *